(12) United States Patent
Cave

(10) Patent No.: US 7,527,427 B2
(45) Date of Patent: May 5, 2009

(54) SUBSTRATE BASED TEMPERATURE SENSING

(76) Inventor: David L. Cave, 2162 E. LaVieve La., Tempe, AZ (US) 85284

( * ) Notice: Subject to any disclaimer, the term of this patent is extended or adjusted under 35 U.S.C. 154(b) by 0 days.

(21) Appl. No.: 11/796,600

(22) Filed: Apr. 27, 2007

(65) Prior Publication Data

US 2007/0217479 A1 Sep. 20, 2007

Related U.S. Application Data

(62) Division of application No. 11/096,701, filed on Mar. 31, 2005, now Pat. No. 7,237,951.

(51) Int. Cl.
*G01K 7/00* (2006.01)

(52) U.S. Cl. ........................................ 374/178; 327/512

(58) Field of Classification Search ................ 374/178; 327/512, 513
See application file for complete search history.

(56) References Cited

U.S. PATENT DOCUMENTS

| 3,851,241 | A | * | 11/1974 | Wheatley, Jr. | ................ 323/226 |
| 6,019,508 | A | * | 2/2000 | Lien | ........................... 374/178 |
| 6,097,239 | A | * | 8/2000 | Miranda et al. | ............. 327/512 |
| 6,957,910 | B1 | | 10/2005 | Wan et al. | |
| 7,010,440 | B1 | * | 3/2006 | Lillis et al. | ..................... 702/65 |
| 2007/0237207 | A1 | * | 10/2007 | Aslan et al. | ................. 374/178 |

* cited by examiner

*Primary Examiner*—Gail Verbitsky
*Assistant Examiner*—Mirellys Jagan
(74) *Attorney, Agent, or Firm*—Knobbe Martens Olson & Bear LLP

(57) ABSTRACT

A method for providing accurate temperature sensing of a substrate utilizing the PN junction of a transistor formed on the substrate is described.

2 Claims, 1 Drawing Sheet

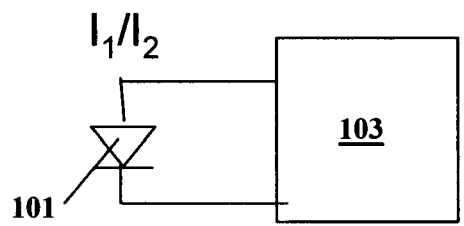
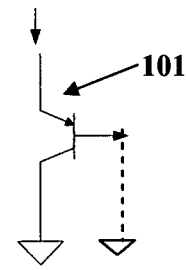
Fig. 1              Fig. 2
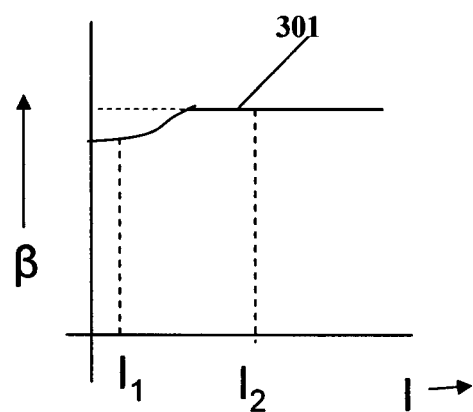
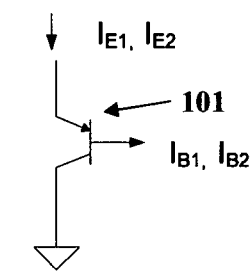
Fig. 4
Fig. 3
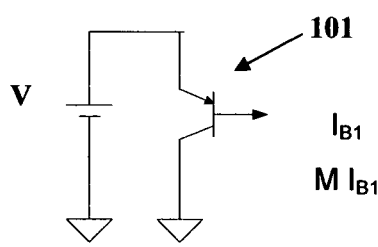
Fig. 5

SUBSTRATE BASED TEMPERATURE SENSING

RELATED APPLICATIONS

This application is a division of U.S. patent application Ser. No. 11/096,701 filed Mar. 31, 2005 now U.S. Pat. No. 7,237,951.

FIELD OF THE INVENTION

This invention pertains to temperature sensing apparatus, in general, and to an easily calibrated temperature sensing apparatus, in particular.

BACKGROUND OF THE INVENTION

A typical approach to measuring temperatures is to utilize a PN diode junction as a temperature sensor. In integrated circuit applications, the PN junction is typically provided by using a bipolar transistor integrated into the substrate.

investigating the properties of PN junction temperature sensors, I have determined that certain inaccuracies result from the standard methodology utilized to sense temperatures of substrates of microprocessors.

SUMMARY OF THE INVENTION

In accordance with the principles of the invention, an improved method of determining the temperature of substrates is provided.

In accordance with the principles of the invention two methods of providing improved and more accurate temperature sensing are provided.

In a first methodology in accordance with the principles of the invention, non constant $\beta$ characteristics of a sensing transistor are compensated in the current provided to the transistor emitter.

In a second methodology in accordance with the principles of the invention, the transistor base current is utilized to determine the temperature of the PN junction.

DETAILED DESCRIPTION

The invention will be better understood from a reading of the following detailed description of illustrative embodiments of the invention in which like reference indicator are utilized to identify like elements, and in which:

FIG. 1 illustrates a temperature sensing configuration to which the invention may be advantageously applied;

FIG. 2 illustrates a temperature sensing transistor;

FIG. 3 illustrates the characteristic curve of a PNP transistor's $\beta$ characteristic;

FIG. 4 illustrates a sensing transistor operated in accordance with one principle of the invention; and FIG. 5 illustrates a sensing transistor operated in accordance with another principle of the invention.

DETAILED DESCRIPTION

FIG. 1 illustrates a typical temperature sensing configurations utilized as part of a temperature sensing and controlling arrangement for use with highly integrated devices such as microprocessors. The configuration includes a PN junction 101 that is subjected to two current levels $I_1$ and $I_2$, by a temperature sensing and control circuit 103.

As shown in FIG. 2, PN junction 101 typically comprises a bipolar transistor. The bipolar transistor is known to give a transfer equation of $$V_{be} = \eta KT/q \ln I_c/I_o$$

Using this knowledge it is possible to determine the temperature of a transistor by driving it with two different currents whose ratio is M. In so doing, the difference in $V_{be}$ between current $I_{c1}$ and $I_{c2}$ is:

$$\Delta V_{be} = \eta KT/q \ln M,$$

where $\eta$ (emission coefficient), K (Boltzmanns Constant), q (electron charge), and ln M are all constants. Thus T (in Kelvin) is directly proportional to $\Delta V_{be}$.

In many circuits, however, the standard bipolar transistor available is a substrate PNP (P source/drain, N well, P substrate), thus we are unable to drive or control the collector current as the collector is tied via the silicon substrate to circuit ground.

Since only the emitter and base terminals are available, the current industry standard practice is to drive the emitter with currents $I_{E1}$ and $I_{E2}$ whose ratio is M.

If $\beta_1 I_{E1} = \beta_2 I_{E2}$ then the collector ratio is also M and temperature is easily determined.

In high performance CMOS processes it is unlikely that $\beta_1 = \beta_2$, further in these processes $\beta$ is typically very low (0.5-2.0). This is shown in the graph of FIG. 3 by curve 301. In this case $I_{E1}/I_{E2} \neq I_{C1}/I_{C2}$ The problem is indicated if the equation for $\Delta V_{be}$ is modified to read:

$$\Delta V_{be} = \eta KT/q \ln[I_{E2}(\beta_1+1)\beta_2]/[I_{E1}(\beta_2+1)\beta_1]$$

If for example $\beta_1 = 0.7$ and $\beta_2 = 0.8$ we may record an error of 10° C. when using the industry approach of driving the emitter. This error is not tolerable when system requirements are errors of 1° C. or less.

In accordance with a first method to correct for this error, beta correction is utilized.

We wish to control $I_{C2}/I_{C1} = M$ thus, $M = (I_{E2} - I_{B2})/(I_{E1} - I_{B1})$ and we can show $$I_{E2} = MI_{E1} + (I_{B2} - MI_{B1})$$

If $\beta_1 = \beta_2$ the second term goes to zero and we drive $I_{E2}/I_{E1} = M$. However, for instances in which $\beta_1 \neq \beta_2$ we modify the current drive to satisfy the above equation.

In accordance with the principles of the invention, a method and circuit implementation to achieve the above equation is as follows:

1. Drive $I_{E1}$ and record $I_{B1}$, $V_{be1}$ and create $MI_{B1}$
2. Drive $MI_{E1}$ and record $I_{B2}$
3. Add $I_{B2} - MI_{B1}$ current to $MI_{E1}$
4. Record $V_{be2}$
5. $\Delta V_{be} = V_{be2} - V_{be1}$
6. Compute temperature This arrangement of transistor 101 is shown in FIG. 4

In accordance with the principles of the invention, the base drive may be utilized. It is a little known and/or used fact that base current also follows an exponential equation $$V_{be} = \eta KT/q \ln I_B/I_o \text{ and thus, } \Delta V_{be} = \eta KT/q \ln I_{B2}/I_{B1}$$

In accordance with this equation accurate temperatures may be recorded by referencing the emitter of transistor 101 to a common voltage $\underline{V}$ and current driving the base with current $I_{B1}$ and $I_{B2}$ such that $I_{B2}/I_{B1} = M$ as shown in FIG. 5

The invention has been described in terms of illustrative embodiments of the invention. It will be apparent to those skilled in the art that various changes may be made without departing from the spirit of scope of the invention. It is not intended that the invention be limited by the embodiments disclosed and described.

What is claimed is:

1. A method of accurately sensing the temperature of a substrate having a sensing transistor formed therein, comprising:

providing a first voltage to the emitter of said transistor;

current driving the base of said transistor with a first current, $I_{B1}$;

measuring a first base emitter voltage, $V_{be1}$;

current driving the base of said transistor with a second current $I_{B2}$ such that $I_{B2}/I_{B1}=M$;

measuring a second base emitter voltage, $V_{be2}$; and determining the temperature utilizing the relationship $$\Delta V_{be} = \eta KT/q \ln I_{B2}/I_{B1}.$$

2. An arrangement for measuring the temperature of a substrate, comprising:

a sensing transistor on said substrate;

a sensing and control circuit coupled to said transistor, said sensing and control circuit operating said transistor under first base current drive conditions to produce a first response and operating said transistor under second base current drive conditions having a predetermined relationship to said first base current drive conditions to produce a second response, said sensing and control circuit utilizing only said first and said second responses in accordance with a predetermined algorithm to determine the temperature of said substrate.

* * * * *